Figure 1:
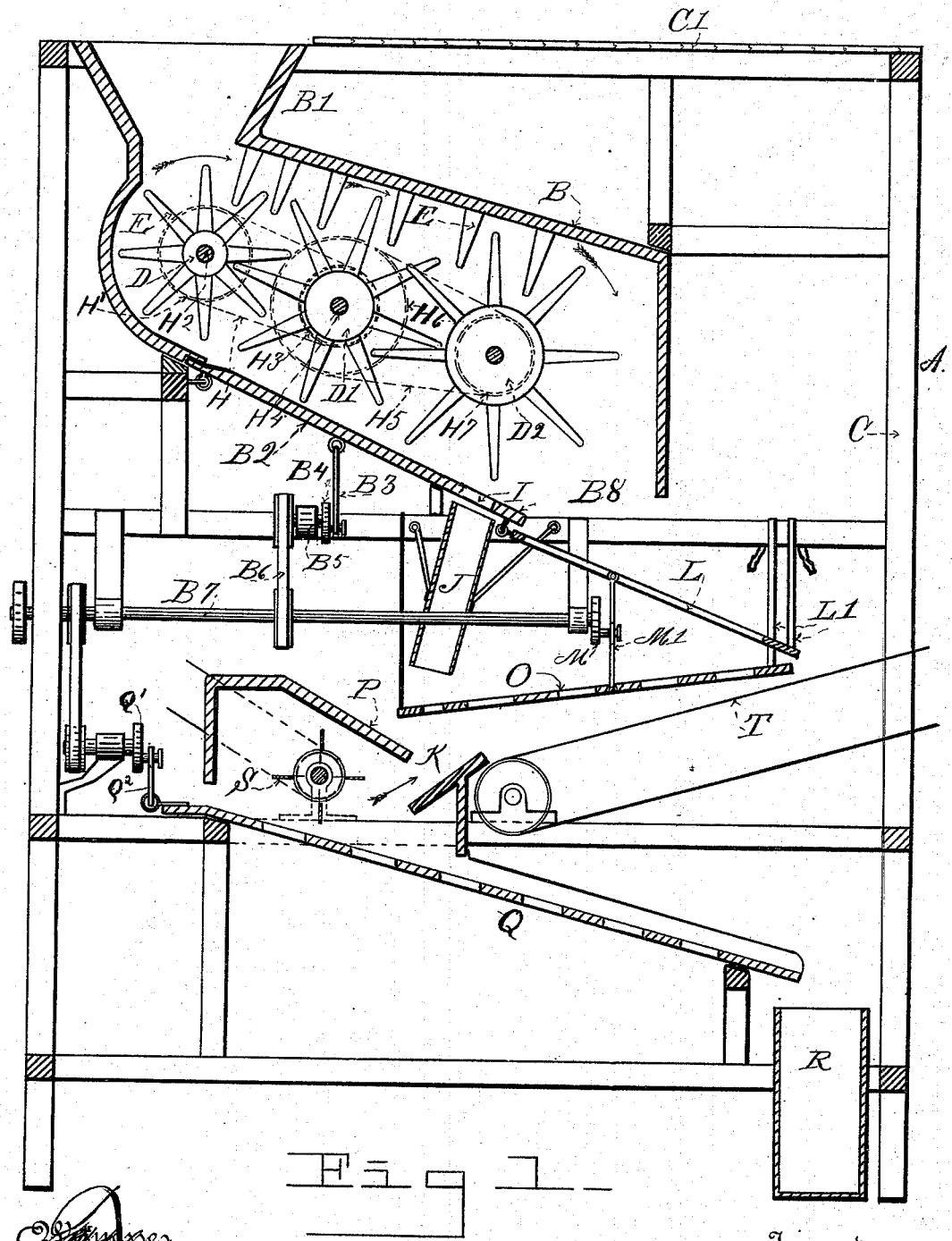

(No Model.) 2 Sheets—Sheet 1.

J. H. EMPSON & P. McDONALD.
PEA SHELLING MACHINE.

No. 527,956. Patented Oct. 23, 1894.

Witnesses
Inventors
John Howard Empson
Peter McDonald
By their Attorney
H. S. Bailey (No Model.) 2 Sheets—Sheet 2.
J. H. EMPSON & P. McDONALD.
PEA SHELLING MACHINE.
No. 527,956. Patented Oct. 23, 1894.
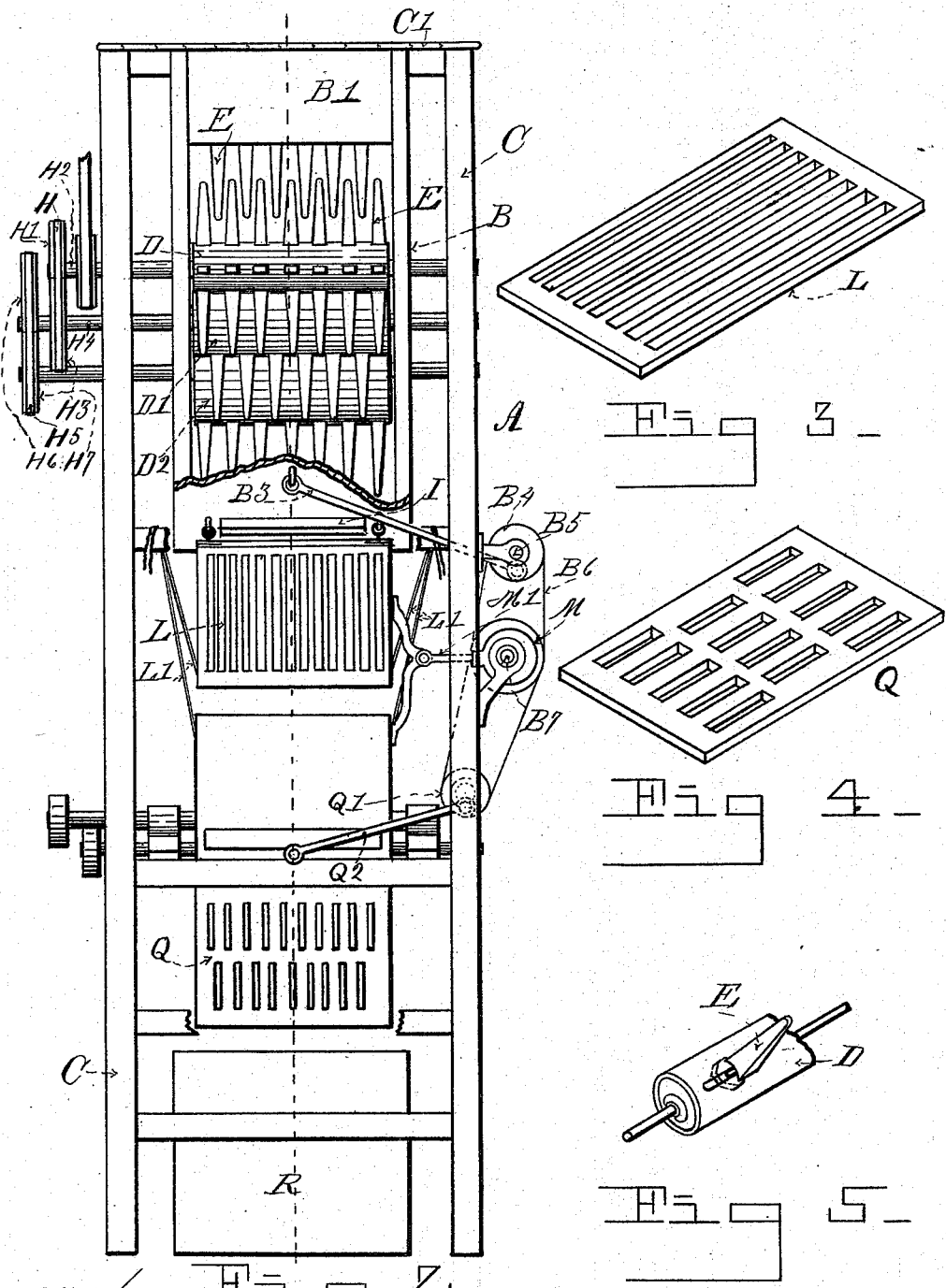

UNITED STATES PATENT OFFICE.

JOHN HOWARD EMPSON AND PETER McDONALD, OF LONGMONT, COLORADO.

PEA-SHELLING MACHINE.

SPECIFICATION forming part of Letters Patent No. 527,956, dated October 23, 1894.

Application filed September 23, 1893. Serial No. 486,313. (No model.)

*To all whom it may concern:*

Be it known that we, JOHN HOWARD EMPSON and PETER McDONALD, citizens of the United States of America, residing at Longmont, in the county of Boulder and State of Colorado, have invented certain new and useful Improvements in Pea-Shelling Machines; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to improvements in machines for shelling green peas from the vines, and the objects of our invention are, first, to provide a machine of simple construction; second, to provide a machine of moderate size with large capacity; third, to provide a machine compact and durable that will thoroughly shell the peas. We attain these objects by the mechanism illustrated and described in the accompanying drawings, in which—

Figure 1 represents a longitudinal, vertical section through the center of the thrasher chamber and portion of the frame in Fig. 2 on line A. Fig. 2 represents an end elevation of the machine with such portions of the thrashing chamber and frame broken away as will show the thrasher blades and drums in elevation. Fig. 3 represents a perspective view of the vine agitator. Fig. 4 represents a perspective view of the pea chaff agitator. Fig. 5 represents a fragmentary view of one of the drums, showing a method of securing the thrasher blades.

Similar letters of reference refer to similar parts throughout the several views.

A designates a pea sheller having a thrashing chamber B supported on the frame C thereof. The chamber B is preferably square or rectangular in cross section but may be conical or other shape if desired, the feed end however being the smaller, and the discharge end being the larger. On the top of the frame is a platform C upon which may be thrown the vines previous to feeding them in the hopper B', the top of which is flush with said platform. The inclined bottom $B^2$ of the chamber is preferably made independent of the rest, and is arranged to be agitated. We show a pitman rod $B^3$ connected eccentrically to a wheel $B^4$ on the shaft $B^5$ for this purpose, which is driven by belt $B^6$ from the shaft $B^7$, but various other devices may be employed for the same purpose. Transversely in this chamber we journal a series of drums D', $D^2$, $D^3$, three being shown, and we believe this number is sufficient but more or less may be used if so desired. On the surface of these drums we arrange several rows of thrasher blades, E, in a manner similar to that shown in Fig. 5, spacing them a short distance apart, and arranging them so that the blades of each drum will revolve freely between those of the next one to it. The top of the thrasher chamber may also be provided with thrasher blades E, also spaced to allow those on the drums to pass between them. The drums must be spaced just far enough apart to allow the blades to revolve close to their surfaces, so as to prevent the vines coiling around them. The drums all preferably revolve in the same direction. Consequently on a plane passing through their centers, the blades pass each other moving in opposite directions. A belt H, on a pulley H', from the shaft $H^2$, of the drum D, drives a smaller pulley $H^3$, on the shaft $H^4$ and gives the drum D', a higher velocity than D. A belt $H^5$, from a large pulley $H^6$, on the shaft $H^4$ to a small pulley $H^7$ on the drum shaft of the drum $D^2$, gives this drum and its thrasher blades a still higher velocity.

The lower end of the thrasher chamber is provided with an opening I, through which the peas drop into the chute J, which leads them into a winnowing chamber K, where they are completely separated from the chaff or small pieces of pods, leaves and vines. The extreme lower end of the thrasher chamber is left open and the vines drop through this opening $B^8$, on to the slatted agitator L, which is continuous of and is attached to the bottom of the chamber B, and frame C in a manner to permit its being raised or lowered at one end, preferably by straps L'. It is also violently agitated preferably by an eccentric M, and pitman M', (or similar means) which receives power from the shaft $B^7$, and which may be arranged in any convenient manner. Below this agitator we arrange in a similar manner a sieve O, which is also agitated by the same or similar means. Below this sieve is the winnowing chamber K, which consists of a partially covered chute P, arranged to receive the peas which are carried along with the vines and dropped through the slatted agitator L, and run down the said sieve O. This chute leads them to another similar sieve Q, which is also agitated preferably by means of an eccentric Q', and pitman $Q^2$, driven from the shaft $B^7$. They run from the sieve into the box R. Below this chute in the winnowing chamber we journal a rotating fan S, or blower. A fan is shown in Fig. 1. The vines drop from the slatted agitator on to the conveyer belt T, which carries them to a cutter where they are cut into ensilage, from which they are conveyed by similar means to the silo.

The operation is as follows:—The vines when thrown into the hopper fall among the thrasher blades of the rapidly revolving drum D, which throws them against the thrasher blades at the top of the chamber. They are quickly carried through these badly broken and then against and between the blades of the next drum D'. Many will be carried completely around by the first drum until they are well broken up. Especially will this be the case with vines three and four feet long. Such vines have a tendency to coil around the drum, but as the blades of the next drum revolve very close to it, they are quickly picked off by them. The blades of the first drum throw the vines to those of the next after they have been disentangled and broken. The second drum also carries them through the blades at the top of the cylinder, and also against and through the blades of the third drum $D^2$, which repeats the operation and drops them on the slatted agitator L. The majority of the peas will be shelled before the vines leave the first drum. They run down the agitated bottom of the chamber and through the opening I and chute T into the winnowing chamber, where a blast of air from the fan S, separates them from the fine chaff which naturally travels with them. The thrashed vines are agitated by the slatted agitator to free any shelled peas which may be lodged among them. These drop through the agitator on to the sieve O, the mesh of which is too fine to allow the peas to pass through. Consequently they run into the winnowing chamber, but a large amount of the leaves and fine pieces of the vines which naturally fall through the slatted agitator, also drop through this sieve onto the conveyer T. The sieve in the winnowing chamber is similar, and is valuable to sift from the peas pieces of grit or leaves which may cling to them from moisture and which the fan may not separate from them, but which may be freed from them by running over said sieve. The thrasher blades are revolved at a high rate of speed and the speed of each successive drum and thrasher blade should be increased to give more forcible treatment to the resisting pods. The high velocity of these blades creates a forcible current of air which finds its natural outlet through the hopper, and drives out with it the dirt, dust and sand which are freed from the vines the moment they come in contact with the blades of the first drum, thus relieving the vines and subsequent ensilage from this objectionable matter.

This machine need not be over three feet wide by eight feet long, and may be constructed of wood or metal or other suitable material.

Having described our invention, what we claim as new, and desire to secure by Letters Patent, is—

1. The combination of a thrashing chamber having teeth depending from its top and enlarging vertically from its feed inlet to its discharge, means for agitating the bottom thereof, and a series of revoluble thrashing drums journaled in said chamber and provided with thrashing blades or arms, the blades of one drum intercurrent with those of the adjoining drums, substantially as set forth.

2. In a pea shelling machine, a frame with a platform thereon, a thrashing chamber supported on said frame, and enlarging vertically from its feed inlet to its discharge end, thrashing mechanism in said chamber, a hopper leading from said platform to said thrashing chamber, an inclined bottom to said thrashing chamber and means substantially as described for agitating said bottom, said parts being combined substantially as described.

3. The combination of a thrashing chamber having an inclined bottom with an opening therein at its lowest end, an agitator at the lower end of said bottom and continuous therewith, an inclined sieve adapted to receive material from said bottom and from said agitator, a partially covered chute receiving material from said sieve, a conveyer below said sieve, and a fan in said chute, the outlet of said chute being adjacent to said conveyer, substantially as and for the purpose set forth.

4. The combination of a thrashing chamber, having the opening I in its bottom, with the agitator L continuous with said bottom, the sieve O below the discharge opening of said bottom and said agitator, and adapted to receive material therefrom, the partially covered chute P, with a fan below the same adjacent to the outlet thereof, the conveyer T below the sieve, O, and adjacent to the discharge opening of the chute P, and the box R, substantially as and for the purpose set forth.

In testimony whereof we affix our signatures in presence of two witnesses.

JOHN HOWARD EMPSON.
PETER McDONALD.

Witnesses:
F. H. STICKNEY,
J. K. SWEENEY.